June 22, 1948. S. H. STUPAKOFF ET AL 2,443,655
MULTIPLE DRILL
Filed Dec. 17, 1942 3 Sheets-Sheet 1

INVENTORS
Oscar James Henry
Semon H. Stupakoff
Lawson E. Stark
by their attorneys
Christy, Parmelee & Strickland

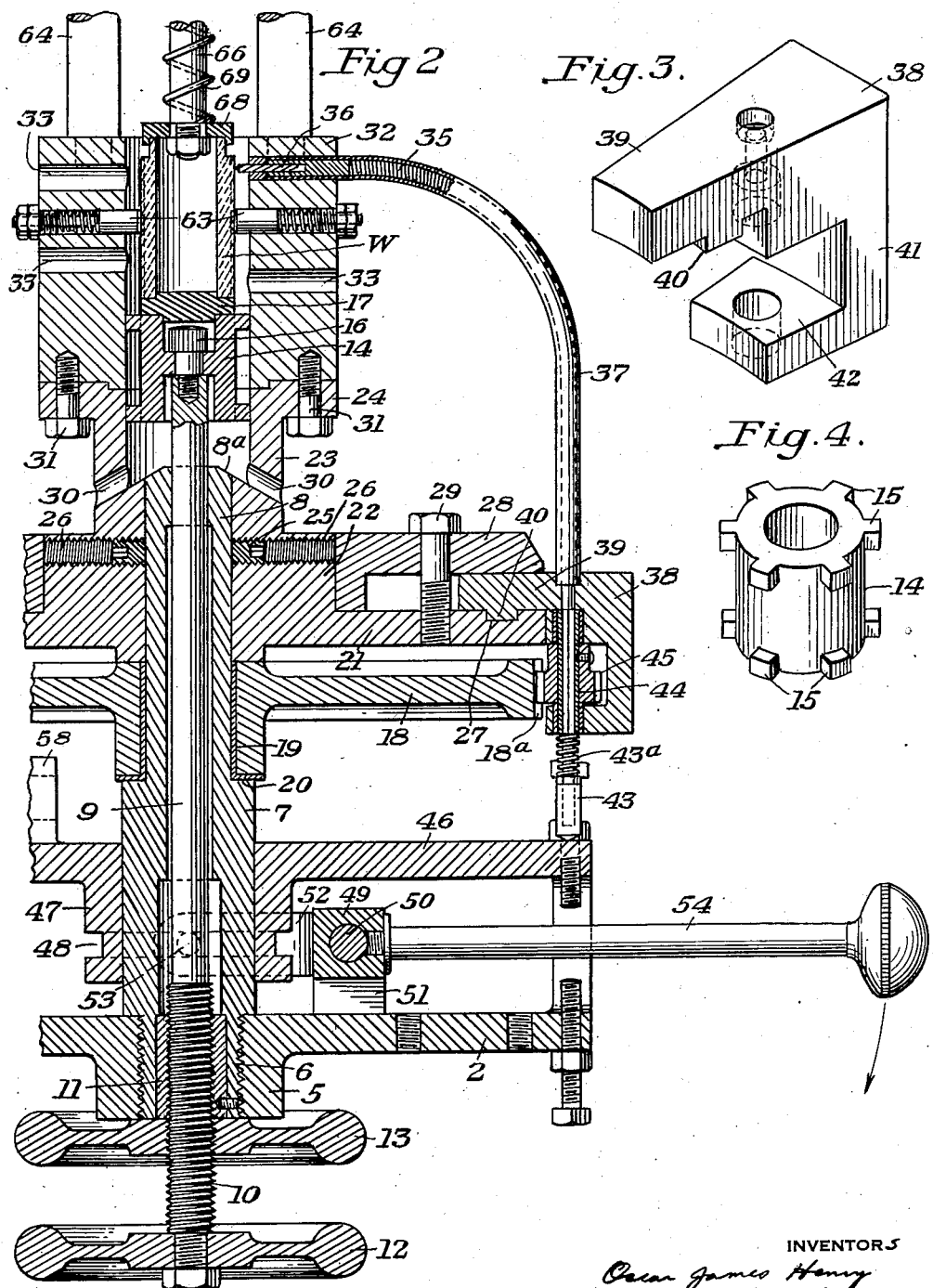

June 22, 1948. S. H. STUPAKOFF ET AL 2,443,655
MULTIPLE DRILL
Filed Dec. 17, 1942 3 Sheets-Sheet 3
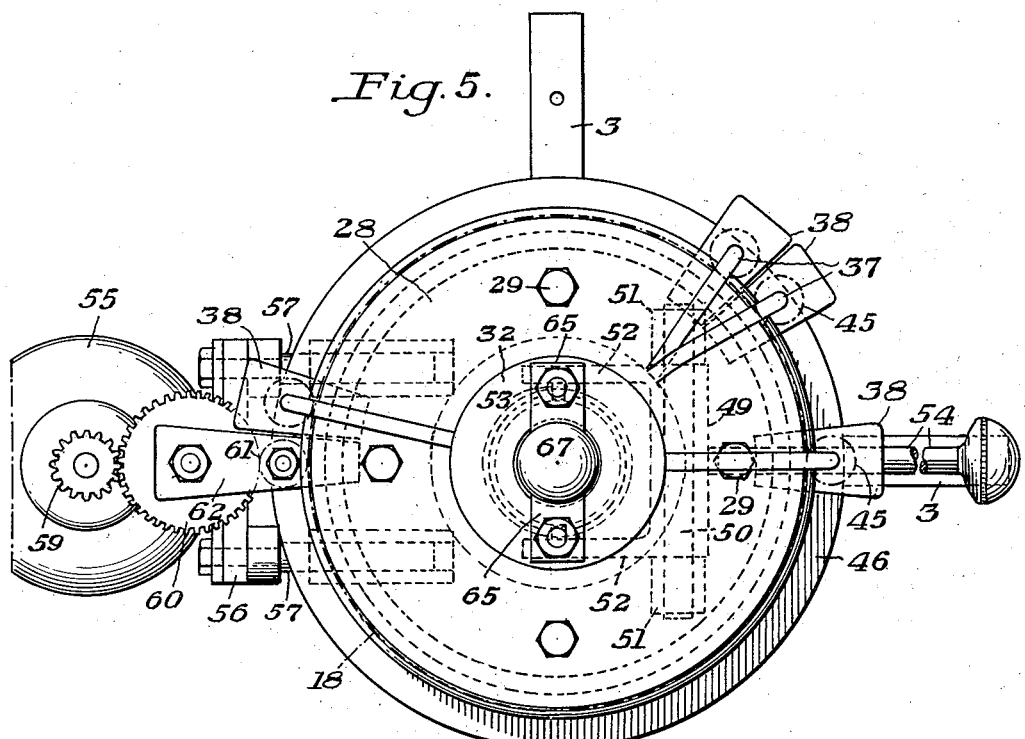
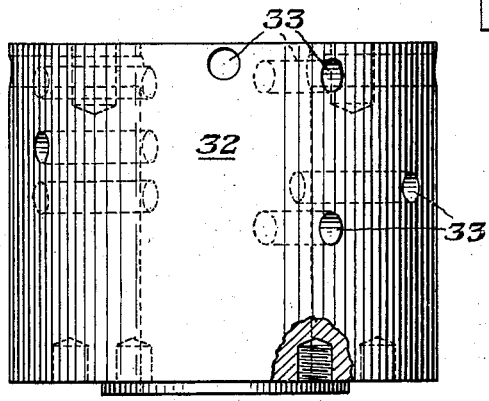
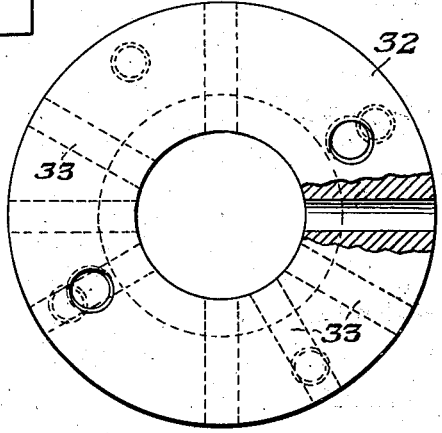
INVENTORS
Oscar James Henry
Semon H. Stupakoff
Lawson E. Stark
by their attorneys
Christy, Parmelee & Strickland Patented June 22, 1948

2,443,655

UNITED STATES PATENT OFFICE 2,443,655

MULTIPLE DRILL

Semon H. Stupakoff, Latrobe, Rawson E. Stark, Greensburg, and Oscar James Henry, Jeannette, Pa., assignors to Stupakoff Ceramic & Manufacturing Co., Latrobe, Pa., a corporation of Pennsylvania Application December 17, 1942, Serial No. 469,318

8 Claims. (Cl. 77—26)

This invention pertains to a drilling machine for boring small holes in manufactured parts and is for a machine for simultaneously drilling several holes.

Our invention has been especially developed for the drilling of holes in ceramic core forms which are used in the manufacture of inductances for radio apparatus and the invention will be particularly described in connection with the production of such articles, but it will be understood that this is merely for the purpose of description and that the machine may be used for the drilling of various other articles formed of various materials.

In the manufacture of ceramic core forms for radio inductances, it is necessary that there be several holes through the core so that wires can be led from the interior of the core to the inductance which is wrapped about the periphery of the core. In order that the inductances will be uniform, both as to their electrical properties and to enable them to be interchangeably used or to be used in the mass production of radio apparatus, it is necessary that the holes be quite accurately located in the work piece. Moreover, after making a quantity of pieces of one style or size it may be necessary to operate upon a run of different articles or different sizes in which the holes are differently positioned. This makes it necessary that any machine for simultaneously drilling a number of holes be adjustable to suit the work piece which it is to be operated upon.

According to the present invention, there is provided a machine which is adapted to carry a removable head which we sometimes term a "master" which has a plurality of radially positioned holes therethrough, this master being of generally cylindrical form so that the holes pass through the walls thereof. This head or master is adapted to surround the work piece. The machine is provided with drill holders that can be inserted and removed from the radial holes in the head or master. Preferably, they are capable of being plugged into the master much the same as telephone cords are plugged into a switchboard. There is a flexible shaft for driving each drill head. The machine further has a common drive through which all of these flexible shafts may be simultaneously operated and the drills all advanced into the work piece at the same rate of speed. By substituting one head or master for another and re-arranging the drill heads the machine can be very quickly changed to operate upon a given piece. Moreover, the driving mechanism for the individual flexible shafts is so arranged as to permit the shafts to be moved around in order that the shaft may extend in as direct a line as possible from the main driving mechanism to the head, thus avoiding the necessity for excessively long flexible shafts or conditions wherein the shafts are turned at sharp or irregular angles.

An important feature of the present invention is that it enables small holes to be produced very close to each other.

Our invention may be more fully understood by reference to the accompanying drawings, in which:

Figure 2 is a fragmentary view similar to Figure 1, showing a portion only of the machine on a larger scale;

Figure 3 is a perspective view of one of the adjustable members for holding a driving pinion for an individual flexible shaft;

Figure 4 is a perspective view of a pedestal or spider construction on which the work holder is carried;

Figure 5 is a top plan view of the machine shown in Figure 1;

Figure 6 is a side elevation of the removable head or master; and

Figure 7 is a top plan view of the member shown in Figure 6.

Figure 1:
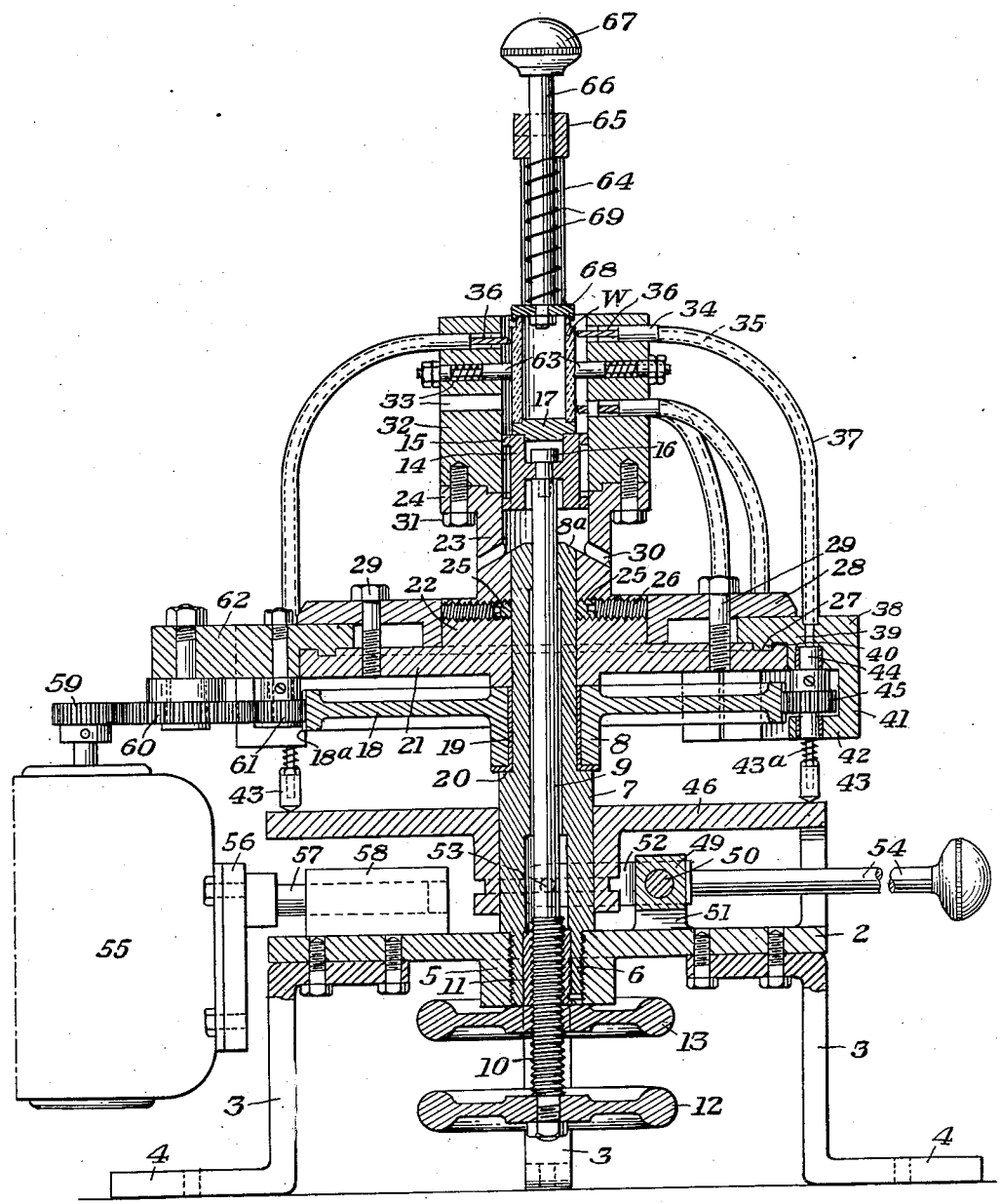
Figure 1 is a transverse vertical section through a machine constructed in accordance with our invention.

Referring to the drawings, 2 designates the base plate or bed of the machine. Bolted to the underside of the bed plate 2 are three or more legs 3 having outwardly turned feet portions 4 which serve as a support for the machine and enable it to be bolted down upon a work bench. At the center of the bed plate 2 is an internally threaded boss 5. Screwed into this boss is the lower reduced end portion 6 of a central post or column 7. This column 7 is rigidly carried on the base. It has an upwardly extending reduced portion 8, the top of which has an inclined surface 8a. Passing upwardly through the column 7 is a shaft 9. The lower end of the shaft 9 is threaded at 10 and the threaded portion thereof is engaged in an internally threaded bushing 11 which is fixed inside the reduced portion 6 of the collar. Fast on the lower end of the shaft 9 is a hand wheel 12 by means of which the shaft can be turned. The turning of the shaft 9 through the hand wheel 12 enables the shaft to be adjusted up or down with respect to the column 7. A hand wheel 13 threaded onto the part 10 of the shaft serves as a lock or jam nut for holding the shaft 9 in any position to which it is adjusted.

Removably carried on the top of the shaft 9 above the top 8a of the column 8 is a support or spider 14 which has the construction shown in Figure 4. The member 14 is cylindrical in form and has projecting lugs 15 at the top and bottom thereof. The interior of the member 14 has a transverse web through which a bolt 16 passes for firmly holding the member 14 on top of the shaft 9. The top of the member 14 serves as a support or pedestal to receive a rest 17 on which the work piece W is set. Differently shaped members 17 may be used for different sizes and shapes of work pieces.

Rotatably mounted on the column 7 above the bed 2 is a large gear wheel 18 having gear teeth on its periphery 18a. A bushing 19 on the post 7 provides a bearing for this gear wheel and the shoulder 20 on the column 7 holds the gear wheel 18 in the desired horizontal plane. Mounted on the reduced portion 8 of the column above the gear wheel 18 is a circular plate 21 having a hub portion 22 from which projects an upwardly extending cylindrical portion or sleeve 23. At the top of the portion 23 is an outwardly turned flange 24. The plate 21 is held in fixed position on the portion 8 of the column by means of set screws 25 which are in threaded openings 26 in the hub 22 and which are screwed tight against the column 8.

The plate 21 is provided with an annular channel 27 near its periphery. Mounted on the plate 2 around the hub 22 is a clamping plate 28 which is held in place by diametrically opposed bolts 29, and purpose of which will be hereinafter more fully described.

In the upwardly extending hollow extension 23 of the hub 22 are downwardly and outwardly inclined openings 30 which are in line with the inclined surface 8a at the top of the portion 8 of the column. Removably secured on the flange 24 by means of bolts 31 is the head or master 32. This comprises a cylinder metal body having a central opening therethrough. This head is provided with a plurality of radial holes 33, the position of the holes corresponding to the position of the holes to be made in the work piece W. The central opening through the head or master 32 is of greater diameter than the work piece W. The lugs 15 on the spider or pedestal 14 engage in part the interior of the head 32 and in part the interior of the portion 23 to keep the work support 17 accurately centered. Chips or dust produced from the drilling of the work piece, falling from the drills, hereinafter described, can pass down between the lugs 15 and slide over the inclined surfaces through the holes 30 onto the exposed surface of the hub 22 from whence they can be brushed or otherwise removed.

Removably and fractionally held in the radial holes 33 are drill heads 34 which are carried at the ends of flexible shafts 35. Each drill head 34 carries a drill 36. The flexible shaft is of the usual construction, having a casing 37. The casing of each flexible shaft 35 terminates in an adjustable bracket or bearing 38 of the form shown in Figure 3. This bearing block or bracket 38 has an upper inwardly extending portion 39 on the under face of which is a rib 40 that enters the annular groove 27 in the platform or plate 21. The member 38 also has a downwardly extending portion 41 on which is an inwardly extending ledge 42. While the casing 37 of the flexible shaft terminates in a well in the top of the bracket 38, the core of the flexible shaft projects down through the bearing block or bracket and the lower end of the core of each flexible shaft is provided on this lower projecting end with a terminal member 43. Surrounding the core of the flexible shaft where it passes through the bearing bracket and splined thereto is a sleeve 44 and fast on the sleeve 44 is a pinion 45. This pinion meshes with the gear teeth 18a on the large gear wheel 18. Thus, rotation of the gear wheel 18 serves to drive each one of the pinions 45, and through these pinions, to turn the various flexible shafts.

The inwardly projecting upper arm 39 of each of the bearing brackets is normally confined under the clamping plates 28 so that when the bolts 29 are tightened down the bearing blocks or brackets 38 cannot move. However, by loosening the bolts 29 so as to loosen the clamping plate 28 the various brackets 38 can be moved about annularly to different positions around the periphery of the gear wheel 18. Moreover, they can be removed from the machine entirely. This arrangement enables as many separate drills to be used as are required in any one piece of work and because the various brackets 38 can be shifted around the periphery of the gear wheel the flexible shafts will extend in as direct lines as possible to their respective holes in the head or master. By reference to Figure 5 it will be clearly seen that where two holes are in vertical alinement the two brackets that drive the drills for making these holes are placed close together and one flexible shaft may be entered in the master over the other. In order that holes may be drilled close together or in vertical alinement in this manner the bracket members 38 are tapered inwardly and they are as narrow as they can be but they are wide enough to prevent interference between their respective pinions.

The terminals 43 of all of the flexible shafts bear against the surface of a disk or table 46 which has a portion 47 fitted about the column 7 below the gear wheel 8 and above the bed 2. By lifting up on the table 46 pressure may be applied to the terminals 43 of the cores of all of the flexible shafts so as to apply endwise pressure for advancing the several drills into the work piece. Springs 43a are confined between the terminals 43 and the under surface of the part 42 of the brackets 38 to retract the drills when the table 46 is lowered.

For raising and lowering the table 46 the hub 47 is provided with an annular groove 48. A fork or yoke member 49 is pivotally supported on a shaft 50 which is carried in lugs 51 on the bed 2. This yoke has two arms 52 having inwardly projecting lugs 53 thereon which engage in the groove 48. An operating handle 54 projects outwardly from the yoke. By pressing down on the handle 54 motion may be transmitted through the yoke to the disk or platform 46 to raise it. Upon release of pressure from the lever 54 gravity will return the parts to the normal position shown in Figure 2. A mechanism is thus provided for simultaneously advancing all of the drills into the work piece.

For driving the large gear wheel 18 there is provided an electric motor 55 (see Figures 1 and 5). This motor is secured to a face plate 56 carried on the ends of parallel rods 57 adjustably held in supporting sleeves 58 on the bed member 2. The motor 55 has a pinion 59. This meshes with an idle pinion 60 which in turn meshes with a smaller pinion 61 that in turn meshes with the periphery of the gear wheel 18.

The pinions 60 and 61 are carried on stud shafts mounted on a bracket 62 that projects outwardly from the platform or table 21. As shown in Figure 5 the driving gears are so arranged that the bracket 62 does not extend over any greater arc at the periphery of the table or platform 21 than do the adjustable brackets 38. This, as shown in Figure 5, enables an adjustable bracket to be positioned very close along the side of the driving gears so that in the event a hole has to be drilled which is on the same radius as the driving gear train, a flexible shaft and its associated drive can be brought very close to radial alinement with such a hole, enabling the flexible drive to be very nearly in line with the hole.

For holding the work piece in the master while it is being drilled, spring-pressed friction pins 63 may be arranged in the master. These pins are urged inwardly by means of springs and can be forced outwardly by the work piece as it is pushed down into the master to rest on the support 17. For further holding the work piece the master may be provided with a cross frame having spaced uprights 64 bolted to the top of the master and having a crossbar 65. Slidable in the crossbar 65 is a vertical rod 66 with an operating knob 67. On the lower end of the rod 66 is a work-engaging clamp or member 68 and a spring 69 confined between the clamp and the crossbar which serves to urge the clamp downwardly against the end of the work piece. The clamp is shaped to conform to the end of the work piece.

In using the machine, when it is determined where the holes are to be positioned in the work piece an appropriate master is prepared in which the holes are accurately positioned to correspond to the holes to be made in the work piece. The master is then mounted on the ledge 24 and bolted in place. The necessary number of brackets 38 with their associated flexible shafts and drill heads are then positioned on the platform 21 and the drill heads are plugged into the nearest holes in the master. The brackets are then adjusted so that the flexible shafts will be as nearly in line with their respective holes as possible and when proper adjustment has been made the plate 28 is clamped down to lock all of the parts in position. The hand wheel 13 is then loosened and the hand wheel 12 is turned to adjust the work holder 17 to the proper vertical height, after which the hand wheel 13 is tightened to lock the parts in position. The machine is then ready to use. The operator, to insert a work piece, pulls up on the knob 67 so that the work-engaging clamp 68 is out of the way and he shoves the work piece down into the master until it rests on the support 17. Then he releases the knob 67 and clamps the work piece in the master. With the motor running so that all of the drills are turning, the operator then presses the handle 54 and advances all of the drills into the work and the debris which results discharges through the holes 30. When the holes have all been drilled, the operator releases the handle 54, and the drills retract. The workpiece may then be removed and another one put in. Once the machine has been set up for a particular work piece the operation of drilling can be performed very rapidly and by unskilled labor.

In some cases two holes may be so close together that the diameters of the drill heads will not permit such holes to be drilled in the same operation. Where such an unusual case is encountered the work piece may be turned after one drilling operation or it may be elevated or lowered by operation of the hand wheel 12 to re-locate the work piece with reference to a particular drill and this drill may then be individually operated by the operator separately advancing the terminal 43 of the particular drill which is to be used twice. A simple way of doing this is to merely grasp it and push it upwardly. However, where this unusual condition is encountered it is usually preferable to use two machines and pass the work piece from one machine to the next and the holes which cannot be made in the first machine are then made in the second machine which has its master designed to make only the hole or holes which the first machine could not produce. Usually, however, the work piece can be designed to avoid any such problem.

While we have illustrated and described one particular embodiment of our invention, it will be understood that this is the present preferred embodiment but that the machine may be modified in various respects and various changes may be made within the contemplation of our invention and under the scope of the following claims.

We claim:

1. A drilling machine of the class described comprising a column having a vertically adjustable work holder, a head member carried on the column about the work holder, a large gear wheel concentrically positioned about the column, means for rotating said gear wheel, a plurality of brackets adjustably supported around the periphery of the gear wheel and movable to different positions around the periphery, a pinion carried in each bracket engaging said gear wheel, a flexible shaft driven by each pinion and a drill head at the end of each flexible shaft entered in a hole in said head member, said flexible shafts having terminals which extend through the pinions which drive them, and means engaging said terminals for applying endwise pressure thereto to advance the drills into the work piece.

2. A drilling machine of the class described comprising a column, a work support at the top of the column, a head member about the work support, a driving member concentrically positioned about the column, a supporting plate adjacent the driving member, a plurality of removable and peripherally adjustable brackets on the supporting plate, each bracket having a pinion therein which engages the driving member to receive power therefrom, each pinion being splined to a flexible shaft which passes therethrough and which has a projecting terminal portion at one end, the other end of said flexible shaft being removably secured in the head member and having a drill holder thereon, and means engaging the projecting terminals of said flexible shafts for imparting endwise movement thereto.

3. A drilling machine of the class described comprising a column, a work support at the top of the column, a head member about the work support, a driving member concentrically positioned about the column, a supporting plate adjacent the driving member, a plurality of removable and peripherally adjustable brackets on the supporting plate, each bracket having a pinion therein which engages the driving member to receive power therefrom, each pinion being splined to a flexible shaft which passes therethrough and which has a projecting terminal portion at one end, the other end of said flexible shaft being removably secured in the head member and having a drill holder thereon, and means engaging the projecting terminals of said flexible shafts for imparting endwise movement thereto, said means comprising a plate member against which all of the terminals are engaged, and means for moving said plate member whereby all of said terminals may be simultaneously moved.

4. A drilling machine of the class described, comprising a column, a work support at the top of the column, a head member about the work support, a driving member concentrically positioned about the column, a supporting plate adjacent the driving member, a plurality of removable and peripherally adjustable brackets on the supporting plate, each bracket having a pinion therein which engages the driving member to receive power therefrom, each pinion being splined to a flexible shaft which passes therethrough and which has a projecting terminal portion at one end, the other end of said flexible shaft being removably secured in the head member and having a drill holder thereon, means engaging the projecting terminals of said flexible shafts for imparting endwise movement thereto, and means for adjusting the work holder vertically with respect to the column.

5. In a machine for drilling holes into a cylindrical work piece, a support for the work piece, a head member adjacent the support adapted to surround the work piece, a plurality of drill heads removably plugged into the head member and held stationary thereby, a universally flexible shaft attached to each drill head, a drill connected with said flexible shaft, a separate driving pinion on each flexible shaft, a common gear wheel for driving all of the pinions, and a common means adjacent said common gear wheel for imparting endwise movement to the several flexible shafts.

6. In a machine for drilling holes into a cylindrical work piece, a support for the work piece, a head member adjacent the support adapted to surround the work piece, a plurality of drill heads removably fixed in the head member, a universally flexible shaft attached to each drill head, a drill connected with each flexible shaft, a separate driving pinion on each flexible shaft, a common gear wheel for driving all of the pinions, a common means for imparting endwise movement to the several flexible shafts relatively to the head, and means for adjustably and removably positioning the driving pinions about the driving member.

7. A drilling machine of the class described comprising a supporting structure, a vertical column on the supporting structure, a supporting plate on the column having an annular groove therein near the periphery thereof, a plurality of bracket members having an arm portion with a rib thereon to engage the channel in the supporting member, a common clamping plate on the supporting member for engaging all of the bracket members to hold them on the supporting member, a gear wheel supported on the column, a pinion mounted in each of said bracket members engaging the gear wheel, a flexible shaft passing through each pinion and having a splined connection with the pinion, each flexible shaft having a terminal that projects beyond the pinion at one end and which has a drill head at the other end, a head member on the column having radial holes therein into which the several drill heads are removably plugged, and means on the column inside the head member for supporting a piece of the work to be drilled.

8. A drilling machine of the class described comprising means for supporting and enclosing an elongated work piece into which holes are to be drilled, a plurality of drill heads in said means annularly and vertically separated from one another, a universally flexible shaft connected to each drill head, a driving bracket at the end of each flexible shaft having a driving element therein through which the flexible shaft extends and by which the flexible shaft is driven, a common driver which engages the driving elements of all of the brackets, the portions of the flexible shafts which project beyond the driving elements having terminals thereon, and means for exerting pressure against said terminal elements to move the drill heads toward the work piece.

OSCAR JAMES HENRY.
SEMON H. STUPAKOFF.
RAWSON E. STARK.

REFERENCES CITED

The following references are of record in the file of this patent:

UNITED STATES PATENTS

| Number | Name | Date |
|---|---|---|
| 723,267 | Gosling | Mar. 24, 1903 |
| 754,321 | Koeppen | Mar. 8, 1904 |
| 1,320,208 | Curtis | Oct. 28, 1919 |
| 1,492,611 | Stevenson et al. | May 6, 1924 |
| 1,835,539 | Thomas | Dec. 8, 1931 |